US012220918B2

(12) United States Patent
Otsuka

(10) Patent No.: US 12,220,918 B2
(45) Date of Patent: Feb. 11, 2025

(54) LIQUID EJECTION HEAD

(71) Applicant: CANON KABUSHIKI KAISHA, Tokyo (JP)

(72) Inventor: Manabu Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 18/057,097

(22) Filed: Nov. 18, 2022

(65) Prior Publication Data

US 2023/0166507 A1 Jun. 1, 2023

(30) Foreign Application Priority Data

Nov. 29, 2021 (JP) ................................ 2021-192914

(51) Int. Cl.
*B41J 2/14* (2006.01)

(52) U.S. Cl.
CPC .. *B41J 2/14274* (2013.01); *B41J 2002/14475* (2013.01)

(58) Field of Classification Search
CPC .......... B41J 2/14274; B41J 2002/14475; B41J 2/1603; B41J 2/1628; B41J 2/1631; B41J 2/161; B41J 2/1623; B41J 2/1642; B41J 2/1646; B41J 2/14233
See application file for complete search history.

(56) References Cited

U.S. PATENT DOCUMENTS

2017/0100934 A1* 4/2017 Masuda ................. B41J 2/1623
2021/0031524 A1* 2/2021 Yonemoto ............. B41J 2/1628

FOREIGN PATENT DOCUMENTS

JP 2007045017 A * 2/2007
JP 2013091272 A 5/2013

* cited by examiner

*Primary Examiner* — Justin Seo
*Assistant Examiner* — Tracey M McMillion
(74) *Attorney, Agent, or Firm* — Canon U.S.A., Inc. I.P. Division

(57) ABSTRACT

A liquid ejection head includes a first substrate having a first surface and a second surface opposite the first surface, the first surface having a structure, a second substrate having a second surface facing the first surface of the first substrate, and a third substrate having a first surface facing the second surface of the first substrate. The first, second, and third substrates are joined together by an adhesive. The second surface of the first substrate has an opening located in a region on a rear side of the structure and having corners each having a curvature radius R2. The second surface of the second substrate has an opening in a region facing the structure and having corners each having a curvature radius R1. The curvature radii R1 and R2 satisfy R1<R2.

16 Claims, 18 Drawing Sheets

FIG. 13B’

LIQUID EJECTION HEAD

BACKGROUND

Field of the Disclosure

The present disclosure generally relates to a liquid ejection head.

Description of the Related Art

Recently manufactured micro-electro-mechanical-system (MEMS) devices, such as pressure sensors and acceleration sensors, include devices each including a substrate set formed by joining substrates together with an adhesive. Examples of such devices include liquid ejection heads that eject liquid.

Examples of such liquid ejection heads include an inkjet print head. The inkjet print head includes energy generating elements to apply energy for ink ejection.

A front surface of a substrate has an ejection-port defining member. The ejection-port defining member has multiple ejection ports for ink ejection. The substrate has through-holes, serving as ink passages, through which ink is supplied from a rear surface of the substrate to the front surface. The through-holes communicate with the ejection ports. After passing through the through-holes, the ink is ejected through the ejection ports by a force applied by the energy generating elements. Examples of the energy generating element includes an element capable of boiling ink by conductive heating, such as a heater element, and an element capable of pressurizing liquid using a change in volume, such as a piezoelectric element.

Japanese Patent Laid-Open No. 2013-91272 discloses a liquid ejection apparatus, which is an exemplary device including a substrate set. Specifically, the apparatus includes pressure generation chambers communicating with nozzle orifices and piezoelectric elements each including a piezoelectric layer and electrodes located on the piezoelectric layer. Liquid accumulated in the pressure generation chambers is ejected through the nozzle orifices.

In a liquid ejection apparatus like that disclosed in Japanese Patent Laid-Open No. 2013-91272, multiple substrates are typically joined together with an adhesive. However, the adhesive may protrude relative to a structure located at joined surfaces of substrates and affect ejection characteristics. For example, the adhesive may overlap a vibration plate of a piezoelectric element, resulting in a change in vibration characteristics. The adhesive may clog a supply port for liquid supply to a common liquid chamber containing an energy generating element and obstruct the liquid supply, thus affecting the ejection characteristics.

SUMMARY

The present disclosure provides for a liquid ejection head with controlled flow of an adhesive relative to a structure located at joined surfaces of substrates.

An aspect of the present disclosure provides a liquid ejection head including a first substrate having a first surface and a second surface opposite the first surface, the first surface having a structure, a second substrate having a second surface facing the first surface of the first substrate, and a third substrate having a first surface facing the second surface of the first substrate. The first substrate and the second substrate are joined together by an adhesive located between the first surface of the first substrate and the second surface of the second substrate. The first substrate and the third substrate are joined together by the adhesive located between the second surface of the first substrate and the first surface of the third substrate. The second surface of the first substrate has an opening that is located in a region on a rear side of the structure and that has corners each having a curvature radius R2. The second surface of the second substrate has an opening that is located in a region facing the structure and that has corners each having a curvature radius R1. The curvature radii R1 and R2 satisfy $R1<R2$.

Further features of the present disclosure will become apparent from the following description of exemplary embodiments with reference to the attached drawings.

DESCRIPTION OF THE EMBODIMENTS

Embodiments of the disclosure will be described below with reference to the drawings. The dimensions, materials, shapes, and relative positions of components described herein may be appropriately changed depending on the configuration of an apparatus to which the present disclosure is applied and various conditions, and are therefore not intended to limit the scope of the disclosure to the following embodiments. Note that known or well-known technology in the art is applicable to a configuration or a step that is not particularly illustrated or described herein. Redundant explanation may be omitted.

As used herein, the term "curvature radius" refers to the shape of each corner of an opening in plan view of each substrate as viewed from a joint interface. Depending on the depth of an opening, such as a recess or a through-hole, from a surface (joint interface) on which an adhesive flows, preferably ½ or more of the depth of the opening has the same curvature radius, more preferably ¾ or more of the depth of the opening has the same curvature radius, most preferably the entire depth of the opening has the same curvature radius.

The following embodiments will describe an example of joining of three substrates. The embodiments are not limited to this example and are applicable to joining of three or more substrates.

First Embodiment

Substrates for a liquid ejection head according to a first embodiment of the present disclosure will be described below with reference to the drawings. In the embodiment described below, specific statements may be made for sufficient explanation of the disclosure. These statements illustrate an example and are not particularly intended to limit the scope of the disclosure.

The liquid ejection head is a member included in a printing apparatus, such as an inkjet printer. The printing apparatus further includes a liquid containing portion that contains liquid to be supplied to the liquid ejection head and a conveying mechanism for a printing medium to be subjected to printing.

Figure 1:
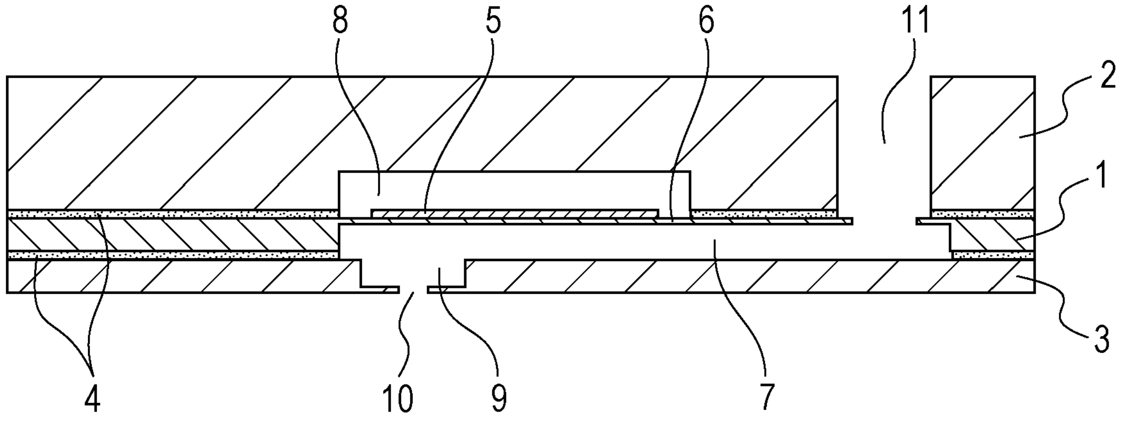
FIG. 1 is a sectional view of joined substrates in a first embodiment.

FIG. 1 is a sectional view of joined substrates for the liquid ejection head according to the first embodiment of the disclosure. In FIG. 1, effects of an adhesive on openings, or the problems to be solved in the disclosure, are not illustrated.

Figure 2A:
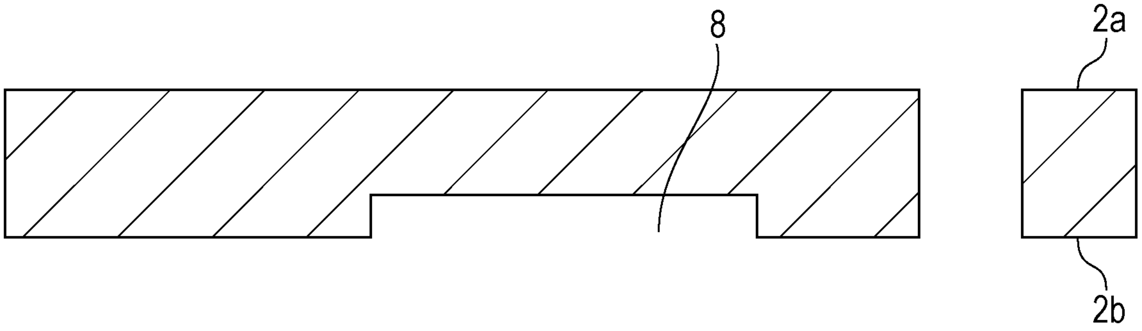
FIGS. 2A to 2C are sectional views of the respective substrates in the first embodiment.
Figure 2B:
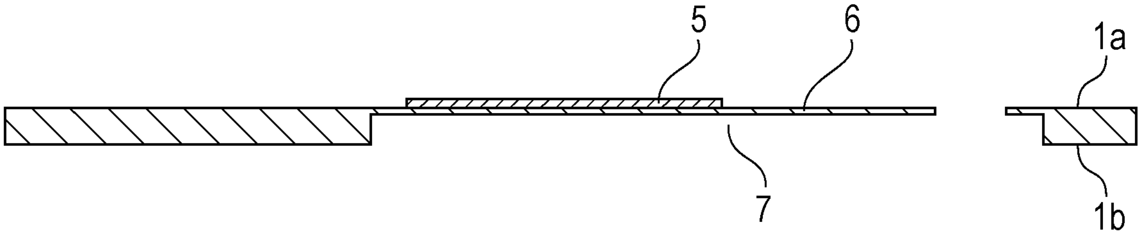
Figure 2C:
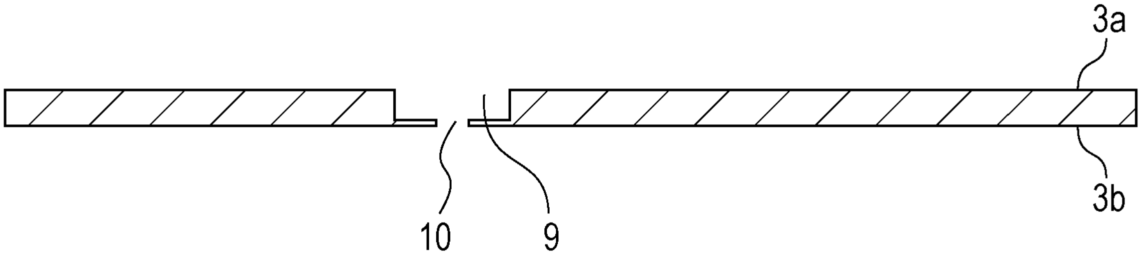

The liquid ejection head includes a first substrate 1, a second substrate 2, and a third substrate 3. The first substrate 1 has a first surface 1*a* and a second surface 1*b*. The second substrate 2 has a first surface 2*a* and a second surface 2*b*. The third substrate 3 has a first surface 3*a* and a second surface 3*b*. FIGS. 2A to 2C are sectional views of the substrates in the first embodiment separated from each other.

The respective substrates are joined together with an adhesive 4 to form a liquid ejection head substrate. In other words, the joined substrates have multiple joined surfaces with at least the adhesive.

The first substrate 1 is, for example, a silicon substrate. The first surface 1*a* has a vibration film 6. The vibration film 6 has thereon a piezoelectric element 5 (structure). The second surface 1*b* has an opening (space) that serves as a pressure chamber 7. The vibration film 6 serves as a top wall of the pressure chamber and defines multiple pressure chambers 7.

The second substrate 2 is, for example, a silicon substrate. The second substrate 2 is disposed to cover the piezoelectric element 5. The second surface 2*b* of the second substrate 2 has a recess 8 facing the piezoelectric element 5, and is joined to the first surface 1*a* of the first substrate 1 by the adhesive 4. The recess 8 receives multiple piezoelectric elements 5 arranged in one-to-one correspondence to the multiple pressure chambers 7.

The third substrate 3 is joined to the second surface 1*b* of the first substrate 1. The third substrate 3 is, for example, a silicon substrate. The third substrate 3 defines the pressure chamber 7 together with the first substrate 1 and the vibration film 6.

The third substrate 3 has a liquid ejection passage 9. The liquid ejection passage 9 has a bottom having an ejection port 10 for liquid ejection. The ejection port 10 and the liquid ejection passage 9 extend through the third substrate 3. The ejection port 10 is located on the opposite side of the third substrate 3 from the pressure chamber 7. Therefore, a change in volume of the pressure chamber 7 causes the liquid accumulated in the pressure chamber 7 to pass through the liquid ejection passage 9 and be ejected from the ejection port 10.

The second substrate 2 has thereon an ink tank (not illustrated). The second substrate 2 has a through-hole 11 extending through the second substrate 2. The through-hole 11 of the second substrate 2 further extends through the first substrate 1 and communicates with the pressure chamber 7 in the first substrate 1. Therefore, the liquid in the ink tank is supplied to the pressure chamber 7 through the through-hole 11.

The piezoelectric element 5 is disposed on the vibration film 6, thus forming a piezoelectric actuator. The piezoelectric actuator includes a lower electrode (not illustrated) on a vibration film forming layer, the piezoelectric element 5 on the lower electrode, and an upper electrode (not illustrated) on the piezoelectric element 5.

The vibration film forming layer is formed by, for example, plasma chemical vapor deposition (CVD). Then, a hydrogen barrier film (not illustrated), the lower electrode (not illustrated), a piezoelectric film, and the upper electrode (not illustrated) are sequentially formed. The lower electrode and the upper electrode are formed by, for example, a sputtering process. The piezoelectric film is formed by a sol-gel process. The piezoelectric film may be formed by a sputtering process.

The piezoelectric element 5 can include a film of lead zirconate titanate (PZT) formed by, for example, a sol-gel process or a sputtering process. The piezoelectric element 5 includes a sintered body of metal oxide crystal. An interlayer and a wiring layer are formed so that the actuator can be driven, thus forming the first substrate 1, serving as an actuator substrate.

The piezoelectric element 5 is located on the opposite side of the vibration film 6 from the pressure chamber 7. In other words, the piezoelectric element 5 is located on the opposite surface of the vibration film 6 from the pressure chamber 7.

The vibration film 6 is deformable toward the pressure chamber 7.

A drive voltage applied to the piezoelectric element 5 by a drive integrated circuit (IC) (not illustrated) causes the piezoelectric element 5 to be deformed by the inverse piezoelectric effect. Thus, the vibration film 6 is also deformed together with the piezoelectric element 5, resulting in a change in volume of the pressure chamber 7. This pressurizes the liquid.

The pressurized liquid passes through the liquid ejection passage 9 and is ejected as minute droplets from the ejection port 10.

Substrate processing illustrated in FIGS. 2A to 2C is not particularly limited and is performed by using a typical substrate fabrication process. For example, a semiconductor manufacturing process can be used for a silicon substrate. A desired etching mask is formed on a surface of the substrate, and Si dry etching is then performed, thus processing the substrate. For the etching mask, for example, a novolak-based photoresist can be used. The substrate can be formed by exposure, development, and patterning.

For Si dry etching, for example, an etching method called the Bosch process can be used. This process includes etching using $SF_6$ gas and coating using $C_4F_8$ gas. The curvature radius of the corners of each opening in the first embodiment of the disclosure can be changed to any value by changing an exposure mask for a photoresist.

Although the openings of at least the surfaces to be joined of these substrates (e.g., the second surface 1*b* of the first substrate 1 and the first surface 3*a* of the third substrate 3) need to be processed before the substrates are joined together, substrate processing, such as opening formation at surfaces other than the surfaces to be joined and substrate thinning, may be performed either before or after the substrates are joined together.

For the adhesive 4, a material that is highly adhesive to substrates can be suitably used. Furthermore, a material that contains few bubbles and exhibits good coating properties can be used. In addition, a material having a low viscosity that allows the adhesive to be thinned can be used. The adhesive can contain a resin such as epoxy resin, acrylic resin, silicone resin, benzocyclobutene resin, polyamide resin, polyimide resin, and urethane resin.

Examples of a method of curing the adhesive 4 include thermal curing and ultraviolet (UV) radiation delayed curing.

If any of the substrates transmits UV rays, UV curing can also be used. A method of applying the adhesive includes applying the adhesive to a dry film in a spin coating manner and transferring the adhesive to any one of the surfaces to be joined of the substrates. The adhesive may be applied in any other manner, such as by screen printing. If the adhesive is a photosensitive adhesive, photolithographic patterning may be used.

The adhesive can be formed at a thick thickness to eliminate voids upon joining the substrates. Before the substrates are joined together, the adhesive has a thickness of 1.0 μm or more, preferably 2.0 μm or more, more preferably 5.0 μm or more.

Thickening the adhesive can reduce or eliminate voids but increases the likelihood that the adhesive may protrude into an opening at joined surfaces. The problems to be solved in the disclosure are likely to occur.

Figure 3:
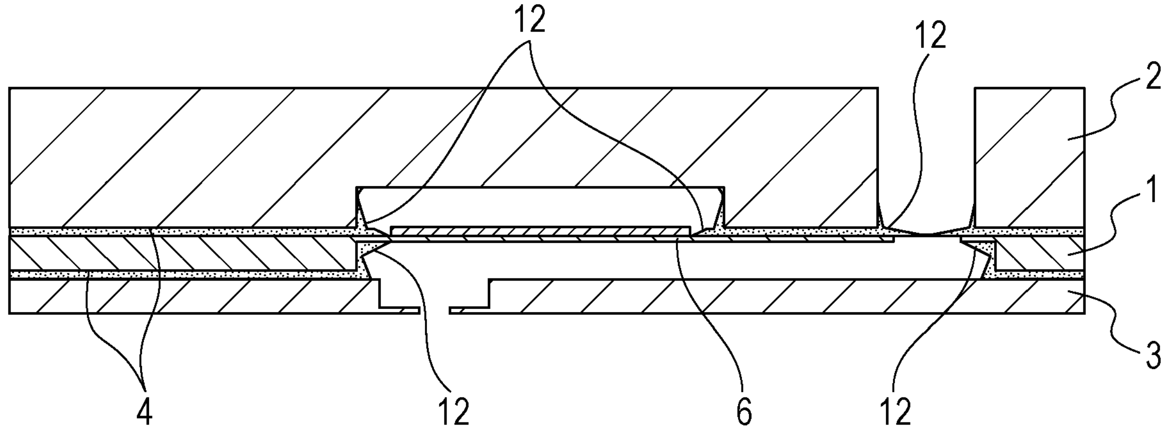
FIG. 3 is a sectional view of the joined substrates illustrating issues addressed in the present disclosure.

FIG. 3 is a schematic sectional view of the first substrate 1, the second substrate 2, and the third substrate 3 joined together with the adhesive 4. Portions 12 affected by the adhesive in FIG. 3 will now be described. If the adhesive 4 is not controlled and kept from protruding, the adhesive 4 may protrude into the recess 8 of the second surface 2*b* of the second substrate 2 and overlap the vibration film 6. Furthermore, the adhesive 4 may protrude into the pressure chamber 7 of the second surface 1*b* of the first substrate 1, extend along corners of the pressure chamber 7, and similarly overlap the vibration film 6. Overlap between protruding parts of the adhesive and the vibration film 6 may affect vibration characteristics of the vibration film 6 and thus affect ejection performance. The through-hole 11, serving as a passage, may be narrowed or blocked by protruding parts of the adhesive, which may affect the ejection performance.

According to the first embodiment of the present disclosure, the relationship between the curvature radii of the corners of the openings at the joined surfaces of the substrates joined together with the adhesive is defined to control the protruding parts of the adhesive, thus achieving good ejection performance.

Figure 5:
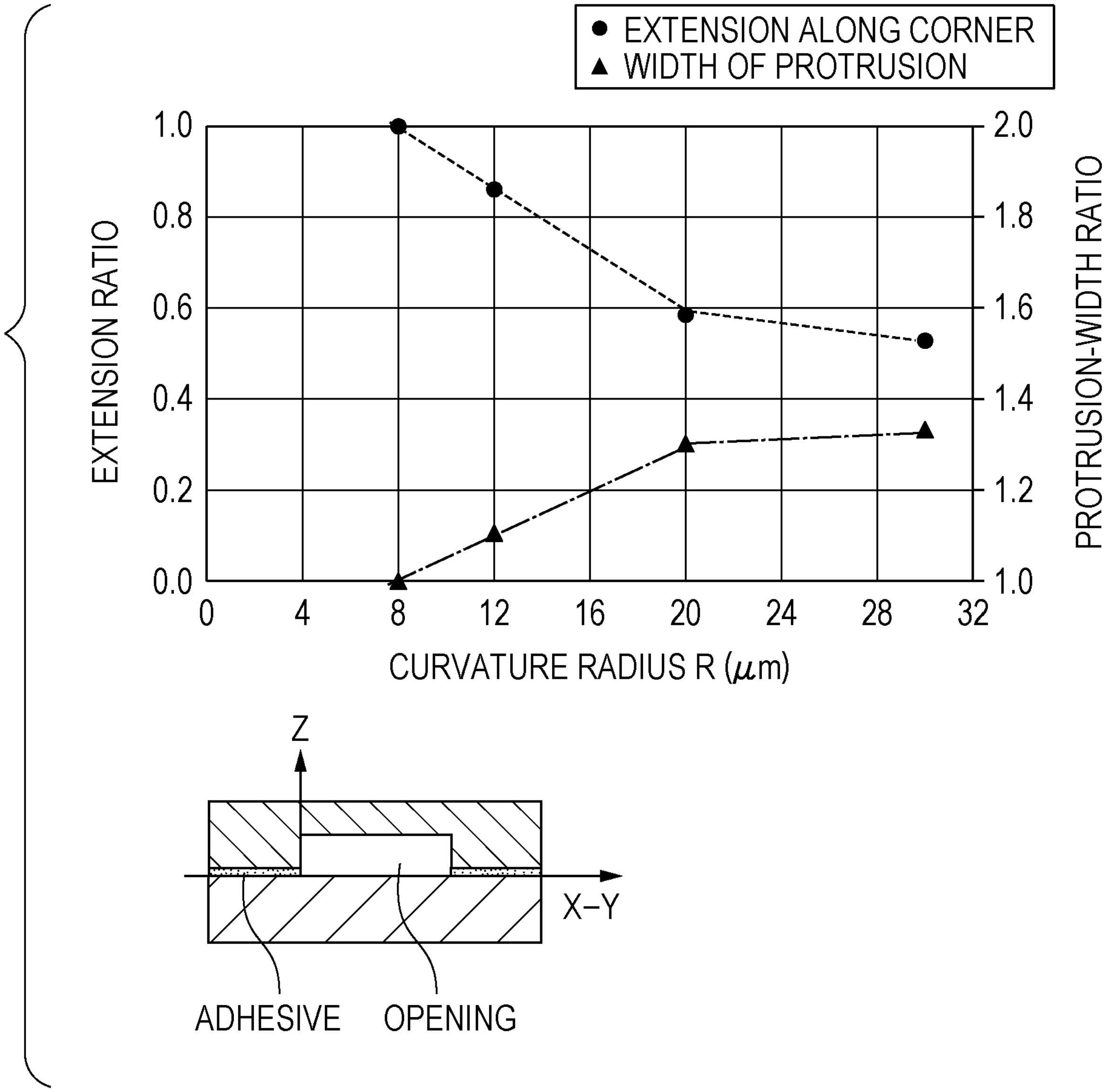
FIG. 5 is a diagram illustrating the relationship between a curvature radius, extension of an adhesive along a corner, and the width of protrusion of the adhesive.

FIG. 5 illustrates measurements of extension of the adhesive along corners of openings of substrates and measurements of the width of protrusion of the adhesive at joined surfaces of the substrates joined together with the adhesive, and illustrates the ratio of each measurement to a reference value at a curvature radius of 8 μm. The substrates having the openings with various curvature radii R were prepared for experiment. The term "extension" as used herein refers to a phenomenon in which surface tension causes the adhesive protruding into the opening to extend along the corner of the opening in a height direction Z relative to a joint interface X-Y. The term "width of protrusion" as used herein refers to the dimension of the adhesive protruding into the opening along the X axis or the Y axis on the same plane as the joint interface X-Y. Referring to FIG. 5, a larger curvature radius R indicates that the extension decreases and the width of protrusion relatively increases. In particular, a curvature radius more than 20 μm indicates that the extension can be sufficiently suppressed. In contrast, a smaller curvature radius R indicates that the extension increases and the width of protrusion relatively decreases. In other words, defining the relationship between the curvature radii of corners of the openings of multiple surfaces to be joined can control the protrusion of the adhesive.

Figure 4A:
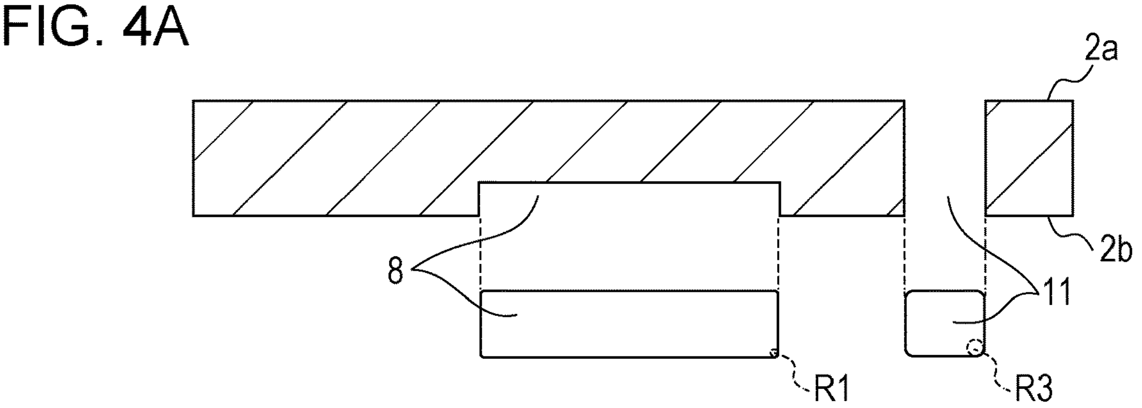
FIGS. 4A to 4A" are sectional views of the respective substrates formed in accordance with the first embodiment of the disclosure.
Figure 4B:
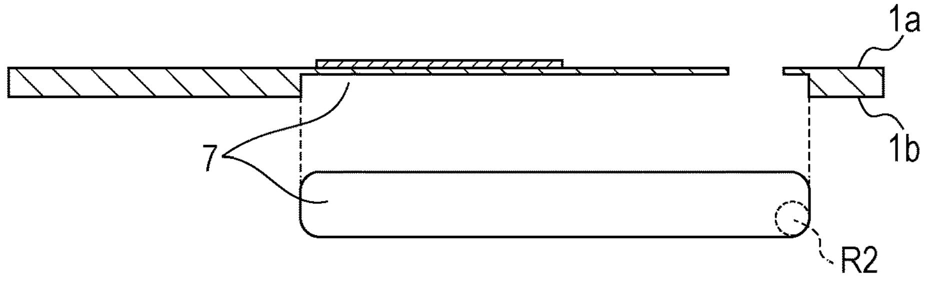
Figure 4C:
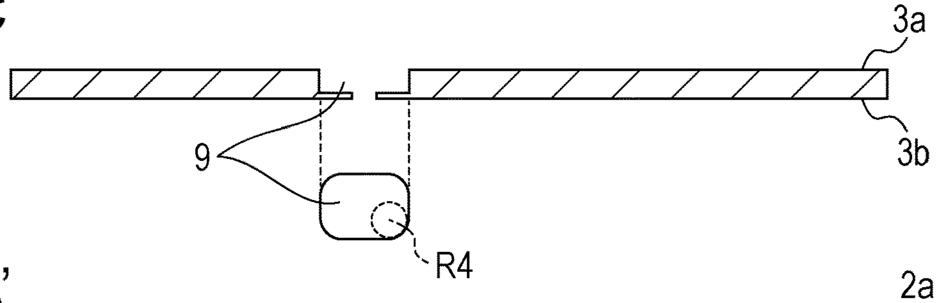
Figure 4A:
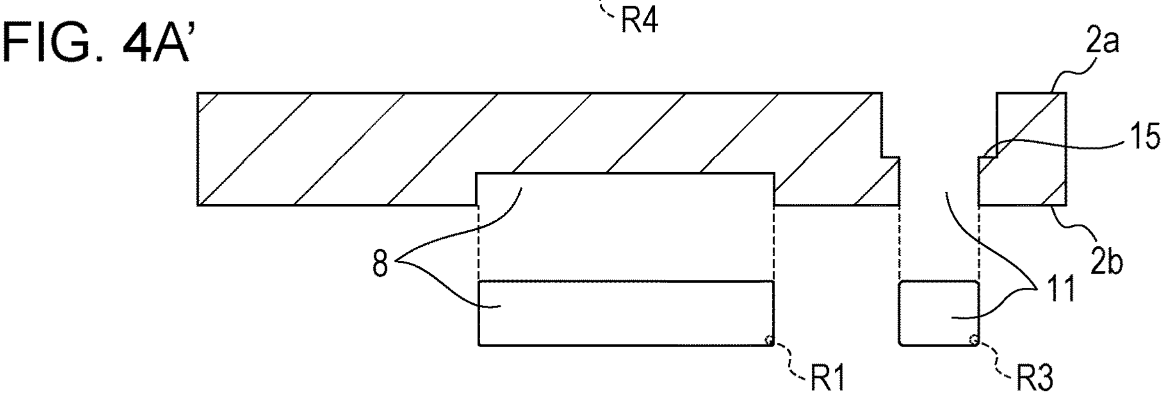
Figure 4A:
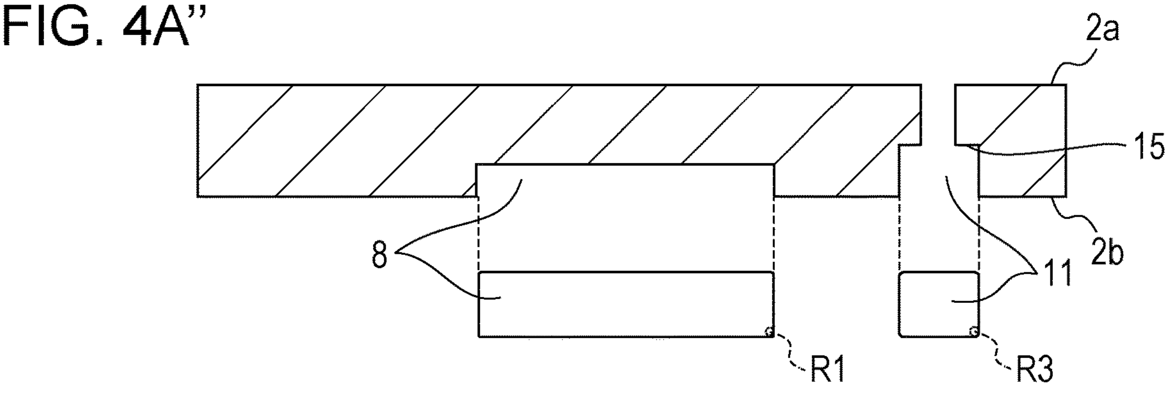

FIGS. 4A to 4C include plan views of the openings of the first substrate 1, the second substrate 2, and the third substrate 3 in the first embodiment of the disclosure. A small curvature radius R1 of each corner of the opening, serving as the recess 8, in FIG. 4A allows the adhesive 4 protruding on the first surface 1*a* of the first substrate 1 to actively extend along the corner of the recess 8, thus reducing the amount of protrusion. This can reduce or eliminate the effects of the adhesive 4 on the vibration film 6.

Furthermore, a large curvature radius R2 of each corner of the pressure chamber 7 in FIG. 4B can inhibit the adhesive 4 protruding on the first surface 3*a* of the third substrate 3 from extending along the corner of the pressure chamber 7. This can reduce or eliminate the effects of the adhesive 4 on the vibration film 6. In other words, the curvature radii R1 and R2 satisfying R1<R2 can reduce or eliminate the effects of the adhesive 4 on the vibration film 6. The opening having the curvature radius R2 is located in a region in the second surface 1*b* of the first substrate 1, and the region is on a rear side of the structure.

As demonstrated in FIG. 5, the curvature radius R1, which is intended to promote extension of the adhesive along the corner and reduce the width of protrusion of the adhesive, in FIG. 4A is preferably less than 12 μm, more preferably less than or equal to 8 μm. The curvature radius R2, which is intended to inhibit the adhesive from extending along the corner, in FIG. 4B is preferably greater than 20 μm, more preferably greater than or equal to 30 μm.

For a curvature radius R3 of each corner of the opening, serving as the through-hole 11, in FIG. 4A, excessive extension of the adhesive along the corner may cause the adhesive to reach and contaminate the first surface 2*a* of the second substrate 2. In contrast, excessive suppression of the extension of the adhesive along the corner may cause the adhesive to reduce the cross-sectional area of the through-hole 11 or block the through-hole 11, thus affecting the flow of ink. Therefore, the curvature radius R3 can satisfy R1<R3<R2 and 12 μm≤R3≤20 μm.

FIGS. 4A' and 4A" each illustrate the through-hole 11 including a stepped portion 15. In such a case, the adhesive 4 extends along the corners and accumulates at the stepped portion 15, so that the adhesive 4 can be inhibited from reaching the first surface 2a of the second substrate 2. Thus, the stepped portion 15 allows the adhesive 4 to actively extend along the corner. In other words, the curvature radius R3 can satisfy $R3 \le R1 < R2$. In this case, a portion of the through-hole 11 that is closer to the first surface 2a of the second substrate 2 than the stepped portion 15 may have a curvature radius that is larger than the curvature radius R3. Such a curvature radius can inhibit the adhesive 4 from reaching the first surface 2a of the second substrate 2.

The liquid ejection passage 9 may have any opening shape. However, the adhesive 4 protruding into the opening that serves as the pressure chamber 7 may reach the liquid ejection passage 9 and affect the ejection port 10. For this reason, as illustrated in FIG. 4C, a curvature radius R4 of each corner of the liquid ejection passage 9 satisfies preferably $R2 = R4$, more preferably $R2 < R4$.

Figure 6:
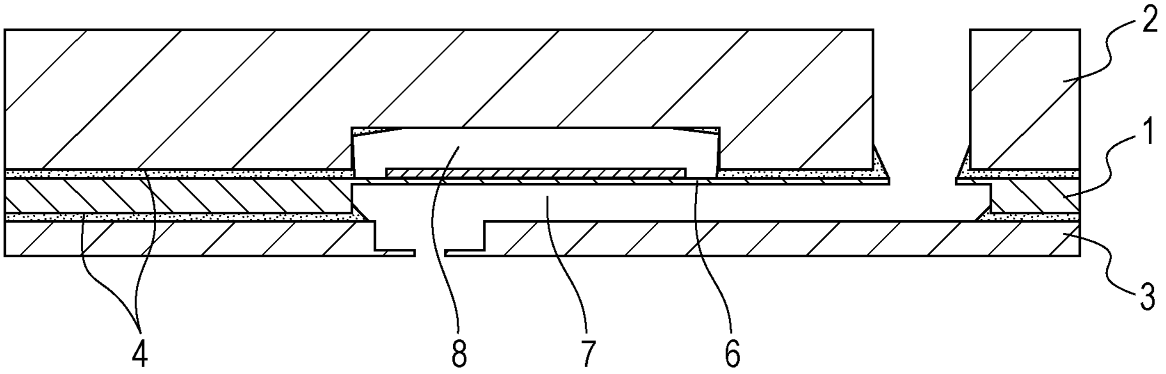
FIG. 6 is a sectional view of the joined substrates formed in accordance with the first embodiment of the disclosure.

FIG. 6 is a sectional view of the substrates joined together by the adhesive 4, or the first substrate 1, the second substrate 2, and the third substrate 3 formed in accordance with the first embodiment of the disclosure as illustrated in FIGS. 4A to 4C. The first embodiment of the disclosure controls protrusion of an adhesive in joined substrates having multiple joined surfaces and allows the joined substrates to have good ejection performance without being affected by the adhesive.

Second Embodiment

Substrates for a liquid ejection head according to a second embodiment of the disclosure will be described below with reference to the drawings. In the embodiment described below, specific statements may be made for sufficient explanation of the disclosure. These statements illustrate an example and are not particularly intended to limit the scope of the disclosure. The following description will focus on the difference between the second embodiment and the first embodiment.

Although the figures of the second embodiment illustrate the liquid ejection head oriented such that ejection ports are located at an upper level and liquid supply ports are located at a lower level, such orientation is taken in fabricating a passage defining member of the liquid ejection head. In most cases, the liquid ejection head is oriented such that the ejection ports are located at a lower level when used.

Figure 7:
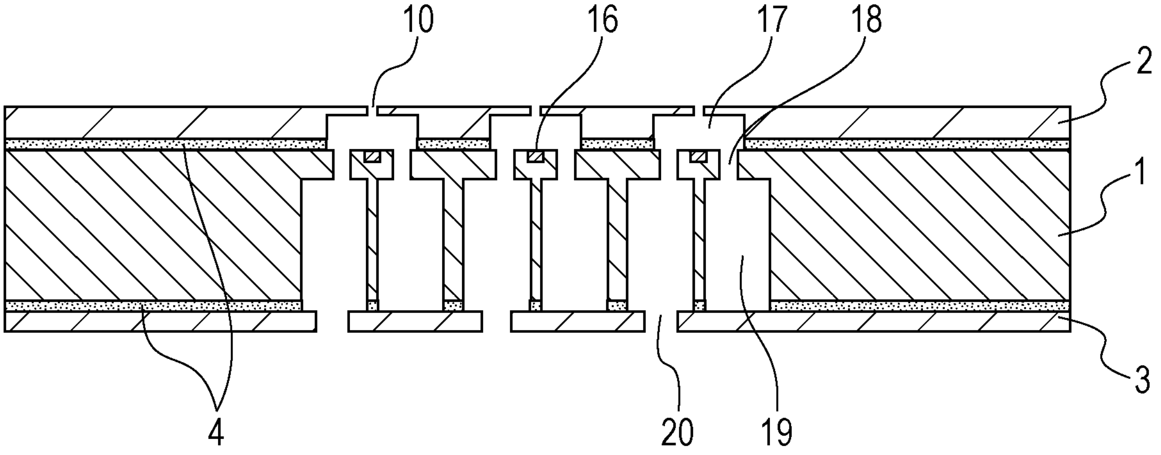
FIG. 7 is a sectional view of joined substrates in a second embodiment.
Figure 8A:
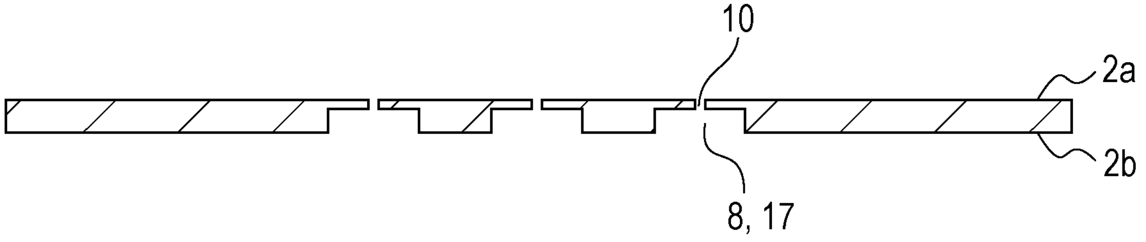
FIGS. 8A to 8C are sectional views of the respective substrates in the second embodiment.
Figure 8B:
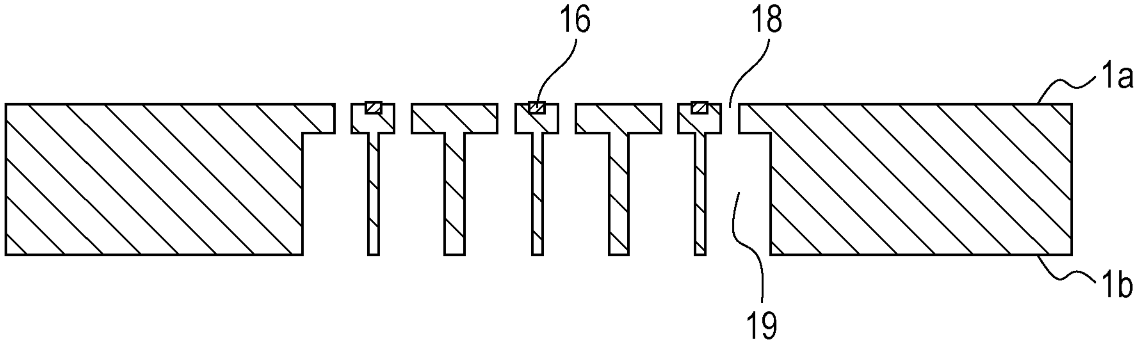
Figure 8C:
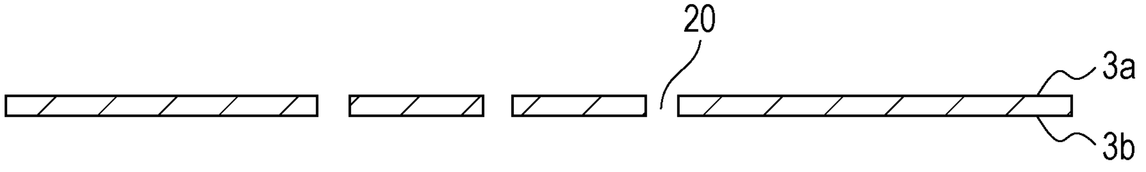

FIG. 7 is a sectional view of joined substrates for the liquid ejection head according to the second embodiment of the disclosure. In FIG. 7, effects of the adhesive on openings, or the problems to be solved in the disclosure, are not illustrated. FIGS. 8A to 8C are sectional views of the substrates in the second embodiment separated from each other. The respective substrates are joined together with the adhesive 4 to form a liquid ejection head substrate.

The first substrate 1 is, for example, a silicon substrate. The first surface 1a has energy generating elements 16 and supply ports 18 corresponding to the energy generating elements 16. The second surface 1b of the first substrate 1 has openings each serving as a passage 19. The supply ports 18 communicate with the passages 19 in the first substrate 1 such that liquid is directed from the passages 19 through the supply ports 18 to common liquid chambers 17 having therein the energy generating elements 16.

The second substrate 2 is, for example, a silicon substrate or a stainless steel substrate. The second substrate 2 is disposed to cover the energy generating elements 16. The second surface 2b of the second substrate 2 has the recesses 8, serving as the common liquid chambers 17, facing the energy generating elements 16. The second substrate 2 is joined to the first substrate 1 such that the recesses 8 receive the multiple energy generating elements 16 arranged in one-to-one correspondence to the multiple common liquid chambers 17. The top of each recess 8 has the ejection port 10 for liquid ejection. The ejection port 10 and the recess 8 extend through the second substrate 2 and correspond to the energy generating element 16. Therefore, a change in volume of the common liquid chamber 17 causes the liquid accumulated in the common liquid chamber 17 to be ejected from the ejection port 10. The second substrate 2 is joined to the first surface 1a of the first substrate 1 by the adhesive 4.

The third substrate 3 is joined to the second surface 1b of the first substrate 1. The third substrate 3 is, for example, a silicon substrate. The third substrate 3 has openings 20 for passage conversion. The openings 20 extend through the third substrate 3.

The openings 20 for passage conversion cause the passages 19 to include liquid supply passages and liquid collection passages. A negative pressure control unit (not illustrated) generates a pressure difference between the liquid supply passage and the liquid collection passage. The pressure difference causes the liquid in the liquid supply passage to flow through the supply port 18 to the common liquid chamber 17 and further flow through the supply port 18 to the liquid collection passage.

This flow allows, for example, liquid increased in viscosity by evaporation through the ejection port 10, bubbles, and a foreign substance, to be collected from the ejection port 10 and the common liquid chamber 17 that are in a printing-stopped state into the liquid collection passage. This can inhibit the liquid in the ejection port 10 and the common liquid chamber 17 from increasing in viscosity.

Furthermore, an ink tank (not illustrated) is disposed upstream of the third substrate 3. The openings 20 for passage conversion in the third substrate 3 communicate with the passages 19 and the supply ports 18 in the first substrate 1 and further communicate with the common liquid chambers 17. In the second embodiment, the supply ports 18 serve as supply paths for the liquid to be ejected by the liquid ejection head.

The first surface 1a of the first substrate 1 has a surface membrane layer (not illustrated) including a wiring layer connected to the energy generating elements 16 and an insulating interlayer. The supply ports 18 and the passages 19 are formed by etching with an etching mask produced using, for example, a photoresist. For example, it is assumed that the energy generating element 16 is an electrothermal transducing element. Under a drive voltage applied by a drive IC (not illustrated), the electrothermal transducing element instantaneously generates bubbles in the liquid. A change in pressure in the common liquid chamber 17 caused by growth of the bubbles is used to eject liquid droplets through the ejection port 10.

Substrate processing illustrated in FIGS. 8A to 8C is not particularly limited and is performed by using a typical substrate fabrication process, as in the first embodiment. The curvature radius of the corners of each opening in the second embodiment of the disclosure can be changed to any value by changing an exposure mask for a photoresist. Although the openings of at least the surfaces to be joined of these substrates need to be processed before the substrates are joined together, substrate processing, such as opening formation at surfaces other than the surfaces to be joined and substrate thinning, may be performed either before or after the substrates are joined together.

A material for the adhesive 4, a method of curing the adhesive 4, and a method of applying the adhesive 4 are the same as those in the first embodiment. The adhesive can be formed at a thick thickness to eliminate voids upon joining the substrates. Before the substrates are joined together, the adhesive has a thickness of 1.0 μm or more, preferably 2.0 μm or more, more preferably 5.0 μm or more. Thickening the adhesive can reduce or eliminate voids but increases the likelihood that the adhesive may protrude into an opening at joined surfaces. The problems to be solved in the disclosure are likely to occur.

Figure 9:
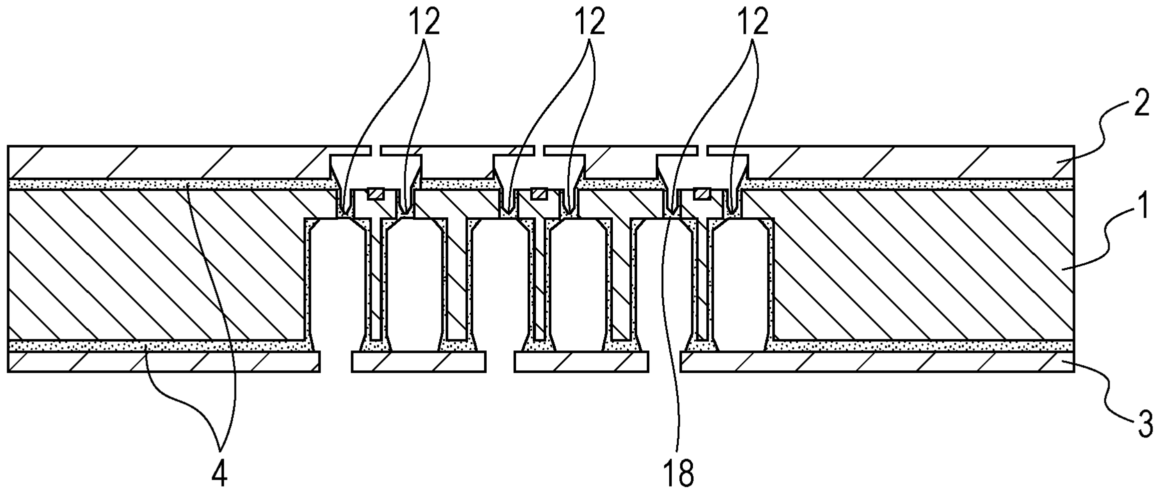
FIG. 9 is a sectional view of the joined substrates illustrating issues addressed in the disclosure.

FIG. 9 is a schematic sectional view of the first substrate 1, the second substrate 2, and the third substrate 3 joined together with the adhesive 4. Portions 12 affected by the adhesive in FIG. 9 will now be described. If the adhesive 4 is not controlled and kept from protruding, the adhesive 4 may protrude into the recesses of the second surface 2*b* of the second substrate 2 and obstruct the supply ports 18. Furthermore, the adhesive 4 may protrude into the passages 19 of the second surface 1*b* of the first substrate 1, extend along corners of the passages 19, and similarly obstruct the supply ports 18.

Obstruction of the supply ports 18 by protruding parts of the adhesive 4 may block the supply ports 18, so that the liquid cannot be supplied to the common liquid chambers 17. For a configuration in which the liquid in the liquid supply passages flows through the supply ports 18 to the common liquid chambers 17 and further flows through the supply ports 18 to the liquid collection passages as in the second embodiment, the supply ports 18 may be narrowed by the protruding parts of the adhesive. This may make it difficult for, for example, the liquid increased in viscosity by evaporation through the ejection ports 10, bubbles, and a foreign substance, to be collected into the liquid collection passages. Thus, the liquid in the ejection ports 10 and the common liquid chambers 17 may increase in viscosity and thus affect ejection performance.

According to the second embodiment of the disclosure, the relationship between the curvature radii of the corners of the openings at the joined surfaces of the substrates joined together with the adhesive is defined to control the protruding parts of the adhesive, thus achieving good ejection performance.

Figure 10A:
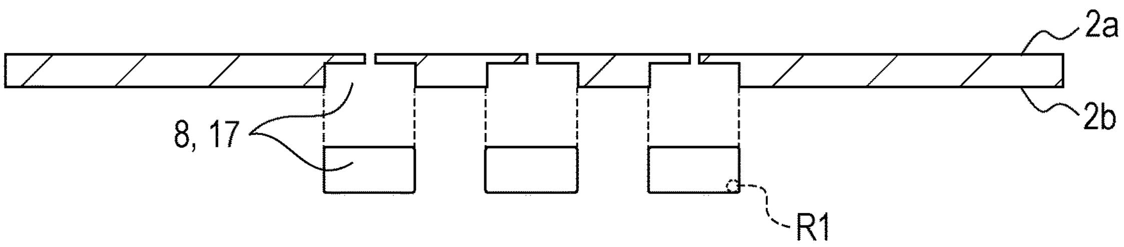
FIGS. 10A to 10C are sectional views of the respective substrates formed in accordance with the second embodiment of the disclosure.
Figure 10B:
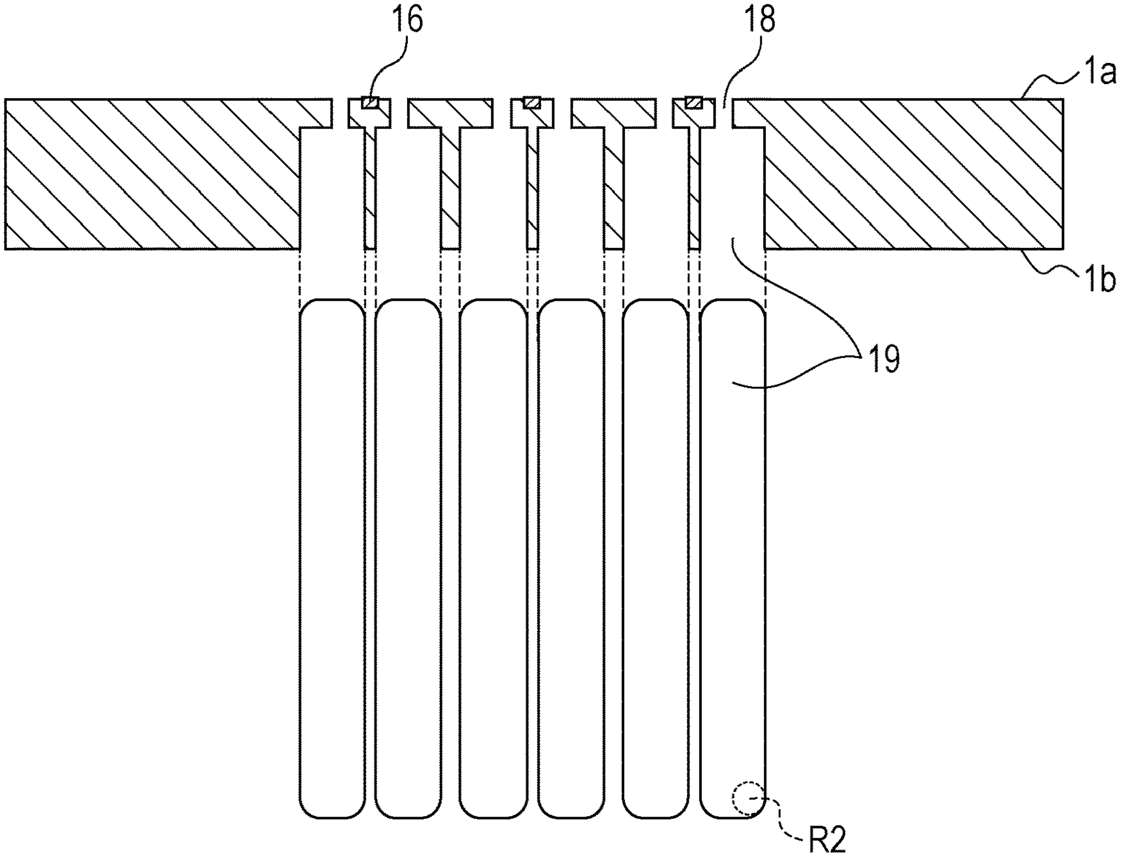
Figure 10C:
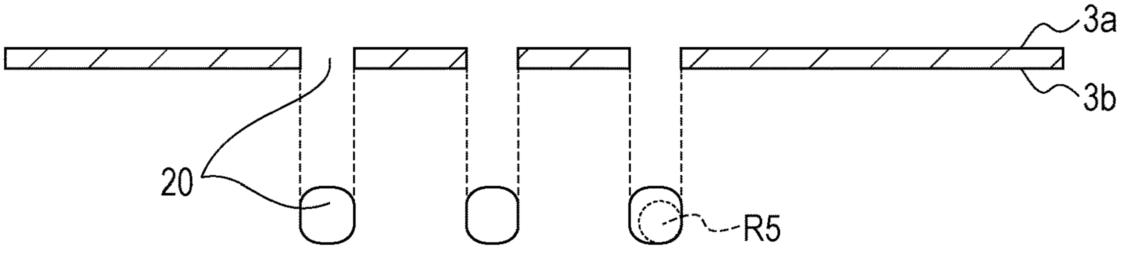

FIGS. 10A to 10C include plan views of the openings of the first substrate 1, the second substrate 2, and the third substrate 3 in the second embodiment of the disclosure. A small curvature radius R1 of each corner of the openings, serving as the recesses 8, in FIG. 10A allows the adhesive 4 protruding on the first surface 1*a* of the first substrate 1 to actively extend along the corners of the recesses 8, thus reducing the amount of protrusion. This can reduce or eliminate the effects of the adhesive 4 on the supply ports 18.

Furthermore, a large curvature radius R2 of each corner of the passages 19 in FIG. 10B can inhibit the adhesive 4 protruding on the first surface 3*a* of the third substrate 3 from extending along the corners of the passages 19. This can reduce or eliminate the effects of the adhesive 4 on the supply ports 18.

In other words, the curvature radii R1 and R2 satisfying R1<R2 can reduce or eliminate the effects of the adhesive 4 on the supply ports 18. Furthermore, the adhesive 4 protruding on the first surface 3*a* of the third substrate 3 may obstruct the openings 20 for passage conversion, extend through the openings, and reach the second surface 3*b* of the third substrate 3. For this reason, a curvature radius R5 of each corner of the openings 20 for passage conversion in the third substrate 3 can satisfy R2<R5, or R1<R2<R5.

As demonstrated in FIG. 5, the curvature radius R1, which is intended to promote extension of the adhesive along the corner and reduce the width of protrusion of the adhesive, in FIG. 10A is preferably less than 12 μm, more preferably less than or equal to 8 μm. The curvature radius R2, which is intended to inhibit the adhesive from extending along the corner, in FIG. 10B is preferably greater than 20 μm, more preferably greater than or equal to 30 μm.

Figure 11:
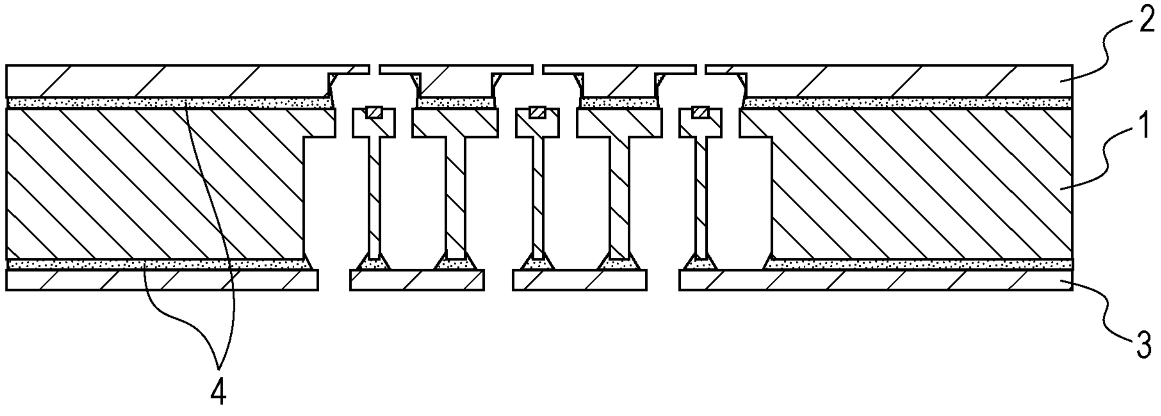
FIG. 11 is a sectional view of the joined substrates formed in accordance with the second embodiment of the disclosure.

FIG. 11 is a sectional view of the substrates joined together by the adhesive 4, or the first substrate 1, the second substrate 2, and the third substrate 3 formed in accordance with the second embodiment of the disclosure as illustrated in FIGS. 10A to 10C. The second embodiment of the disclosure controls protrusion of an adhesive in joined substrates having multiple joined surfaces and allows the joined substrates to have good ejection performance without being affected by the adhesive.

Third Embodiment

Substrates for a liquid ejection head according to a third embodiment of the disclosure will be described below with reference to the drawings. In the embodiment described below, specific statements may be made for sufficient explanation of the disclosure. These statements illustrate an example and are not particularly intended to limit the scope of the disclosure. The following description will focus on the difference between the third embodiment and the first embodiment.

Figure 12:
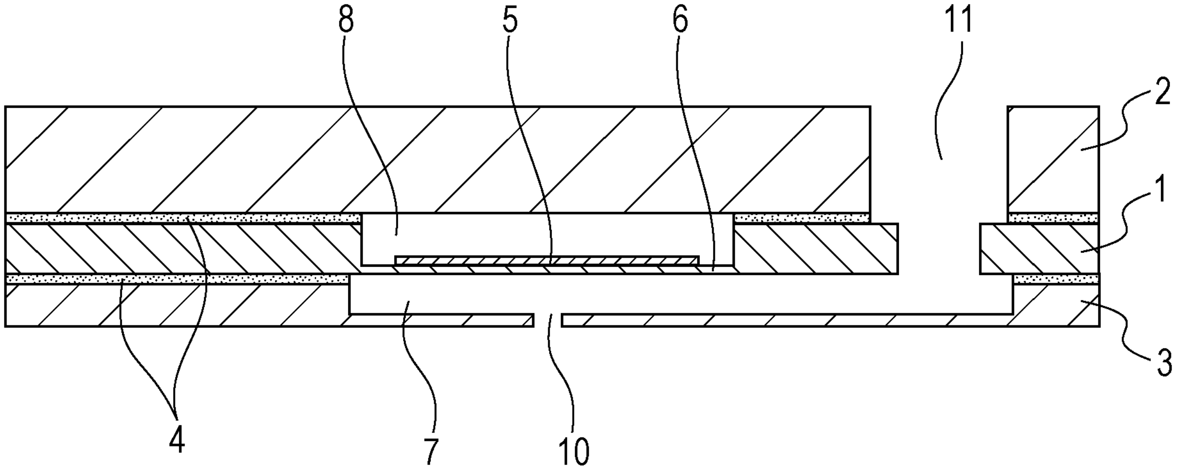
FIG. 12 is a sectional view of joined substrates in a third embodiment.
Figure 13A:
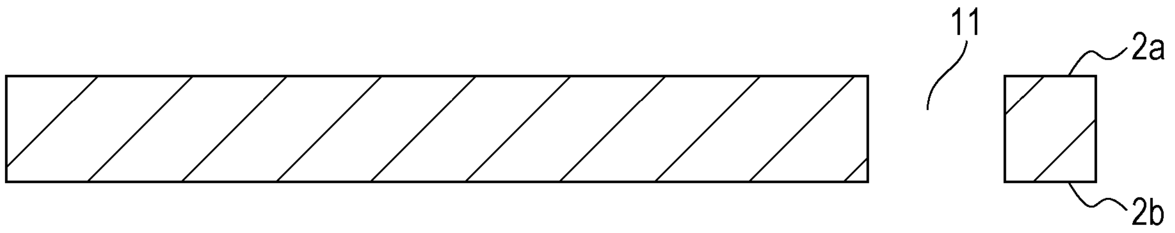
FIGS. 13A to 13B' are sectional views of the respective substrates in the third embodiment.
Figure 13B:
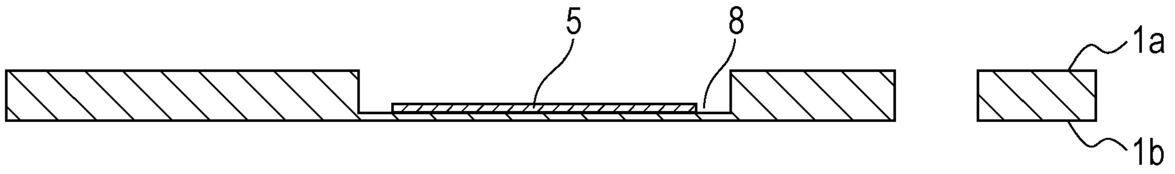
Figure 13C:
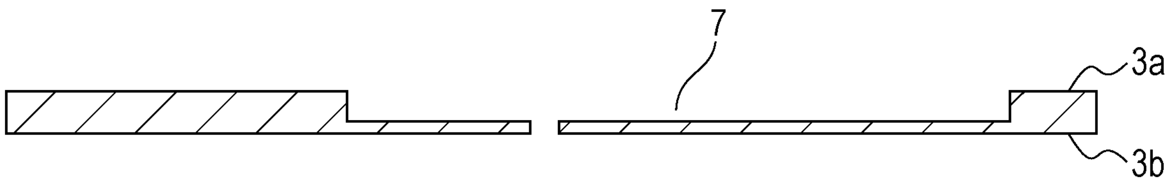
Figure 13C:
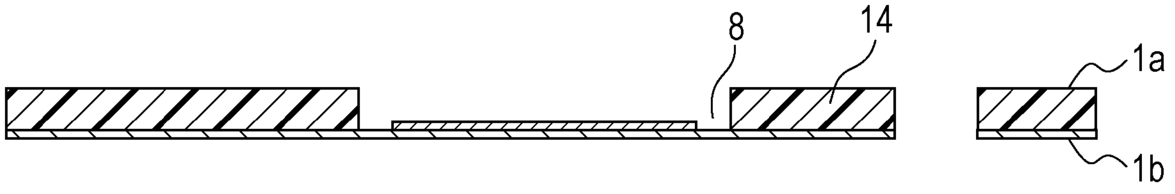

FIG. 12 is a sectional view of joined substrates for the liquid ejection head according to the third embodiment of the disclosure. In FIG. 12, effects of the adhesive on openings, or the problems to be solved in the disclosure, are not illustrated. FIGS. 13A to 13C are sectional views of the substrates in the third embodiment separated from each other. The respective substrates are joined together with the adhesive 4 to form a liquid ejection head substrate.

The first substrate 1 is, for example, a silicon substrate. The first surface 1*a* has the vibration film 6 and the recess 8 located on the vibration film 6. The piezoelectric element 5 is located on the bottom of the recess 8. The recess 8 may be formed by processing the substrate. As illustrated in FIG. 13B', the recess 8 can be formed at a desired position by exposure and development with, for example, a permanent resist 14, such as SU-8.

The second substrate 2 is, for example, a silicon substrate. The second substrate 2 is disposed to cover the piezoelectric element 5. The second surface 2*b* of the second substrate 2 is joined to the first surface 1*a* of the first substrate 1 by the adhesive 4.

The first surface 3*a* of the third substrate 3 has an opening that serves as the pressure chamber 7. The respective substrates are joined together such that the recess 8 receives multiple piezoelectric elements 5 arranged in one-to-one correspondence to multiple pressure chambers 7.

The third substrate 3 is, for example, a silicon substrate, and at least has the opening, serving as the pressure chamber 7, and the ejection port 10 for liquid ejection. Although the liquid ejection passage illustrated in the first embodiment is not illustrated in the third embodiment, the liquid ejection passage may be located between the pressure chamber 7 and the ejection port 10 as in the first embodiment.

The first surface 3*a* of the third substrate 3 is joined to the second surface 1*b* of the first substrate 1. The vibration film 6 serves as the top wall of each pressure chamber 7 and defines the multiple pressure chambers 7.

Figure 14:
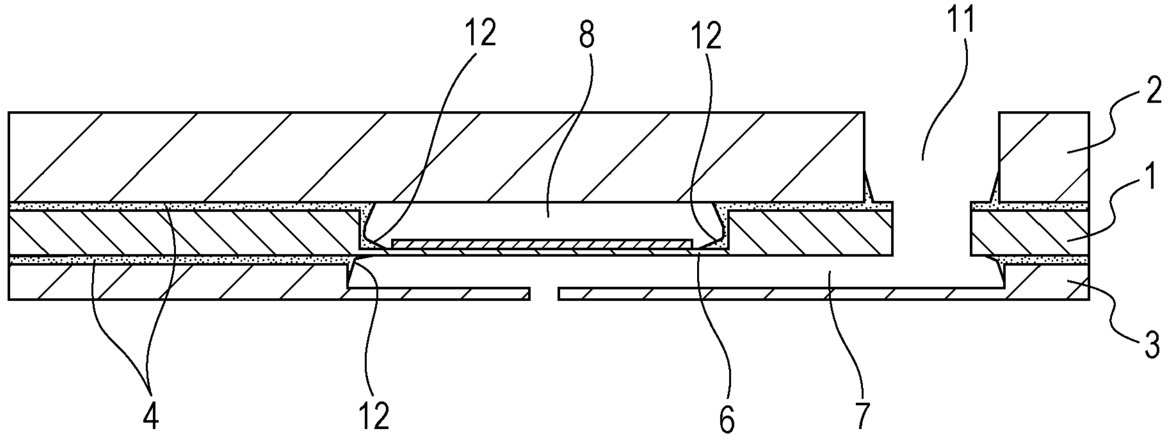
FIG. 14 is a sectional view of the joined substrates illustrating issues addressed in the disclosure.

FIG. 14 is a schematic sectional view of the first substrate 1, the second substrate 2, and the third substrate 3 joined together with the adhesive 4. Portions 12 affected by the adhesive in FIG. 14 will now be described. If the adhesive 4 is not controlled and kept from protruding, the adhesive 4 may protrude into the recess 8 of the first surface 1*a* of the first substrate 1, extend along the corners of the recess 8, and overlap the vibration film 6. Furthermore, the adhesive 4 may protrude into the pressure chamber 7 of the first surface 3*a* of the third substrate 3 and overlap the vibration film 6. Overlap between protruding parts of the adhesive and the vibration film 6 may affect vibration characteristics of the vibration film 6 and thus affect ejection performance.

According to the third embodiment of the disclosure, changing the curvature radii of the corners of the openings at the joined surfaces of the respective substrates controls the protruding parts of the adhesive, thus achieving good ejection performance.

Figure 15A:
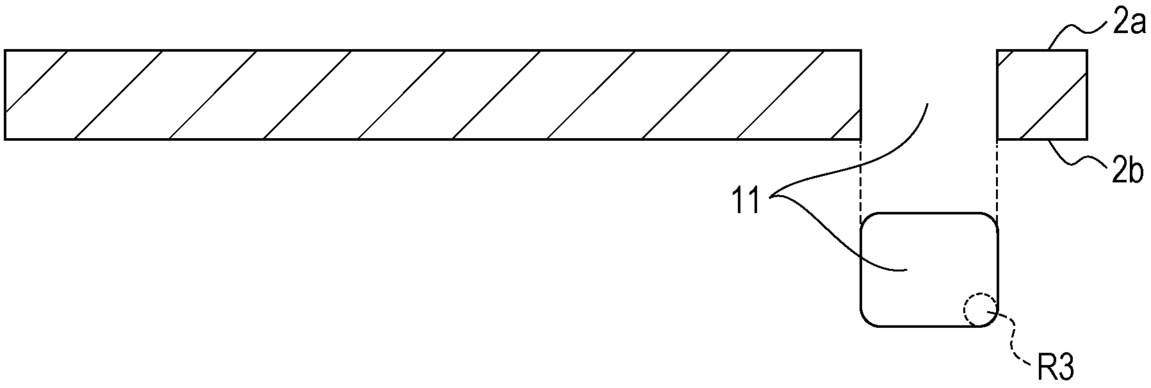
FIGS. 15A to 15C are sectional views of the respective substrates formed in accordance with the third embodiment of the disclosure.
Figure 15B:
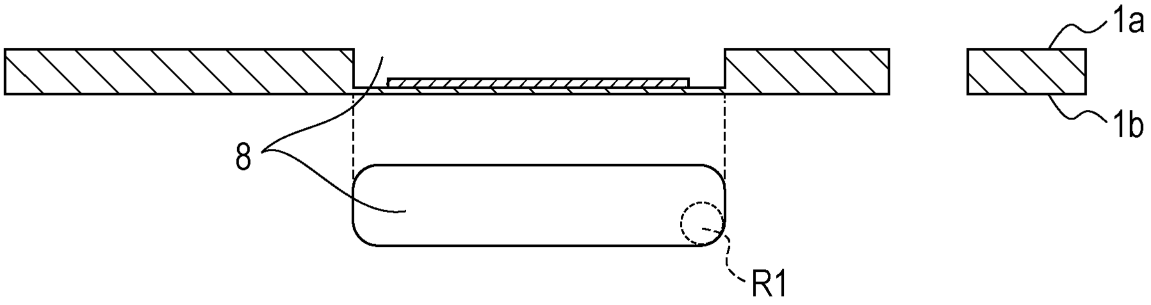
Figure 15C:
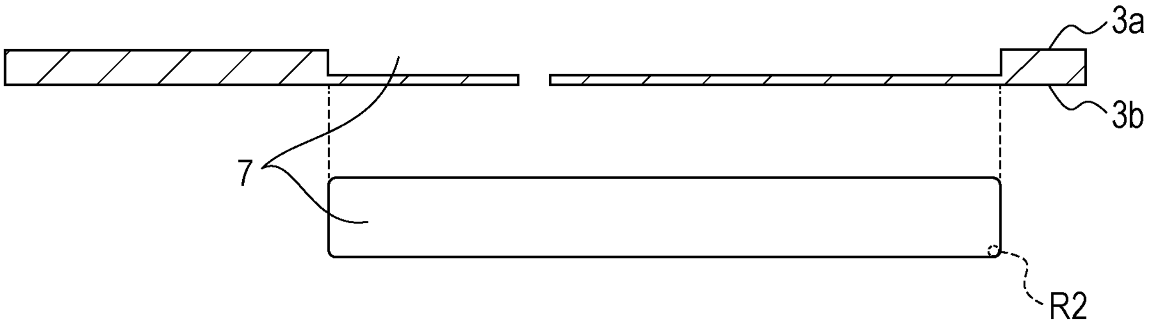

FIGS. 15A to 15C include plan views of the openings of the first substrate 1, the second substrate 2, and the third substrate 3 in the third embodiment of the disclosure. A large curvature radius R1 of each corner of the opening, serving as the recess 8, in FIG. 15B can inhibit the adhesive 4 protruding on the first surface 1*a* of the first substrate 1 from extending along the corner of the recess 8, thus reducing or eliminating the effects of the adhesive 4 on the vibration film 6.

Furthermore, a small curvature radius R2 of each corner of the pressure chamber 7 in FIG. 15C allows the adhesive 4 protruding on the first surface 3*a* of the third substrate 3 to extend along the corner of the pressure chamber 7, thus reducing or eliminating the effects of the adhesive 4 on the vibration film 6. In other words, the curvature radii R1 and R2 satisfying R1>R2 can reduce or eliminate the effects of the adhesive 4 on the vibration film 6.

As demonstrated in FIG. 5, the curvature radius R1, which is intended to inhibit the adhesive from extending along the corner, is preferably greater than 20 μm, more preferably greater than or equal to 30 μm. The curvature radius R2, which is intended to promote extension of the adhesive along the corner, is preferably less than 12 μm, more preferably less than or equal to 8 μm.

For the curvature radius R3 of each corner of the opening, serving as the through-hole 11, in FIG. 15A, excessive extension of the adhesive along the corner may cause the adhesive to reach and contaminate the first surface 2*a* of the second substrate 2. In contrast, excessive suppression of the extension of the adhesive along the corner may cause the adhesive to reduce the cross-sectional area of the through-hole 11 or block the through-hole 11, thus affecting the flow of the liquid. Therefore, the curvature radius R3 can satisfy R1>R3>R2 and 12 μm≤R3≤20 μm.

Figure 16:
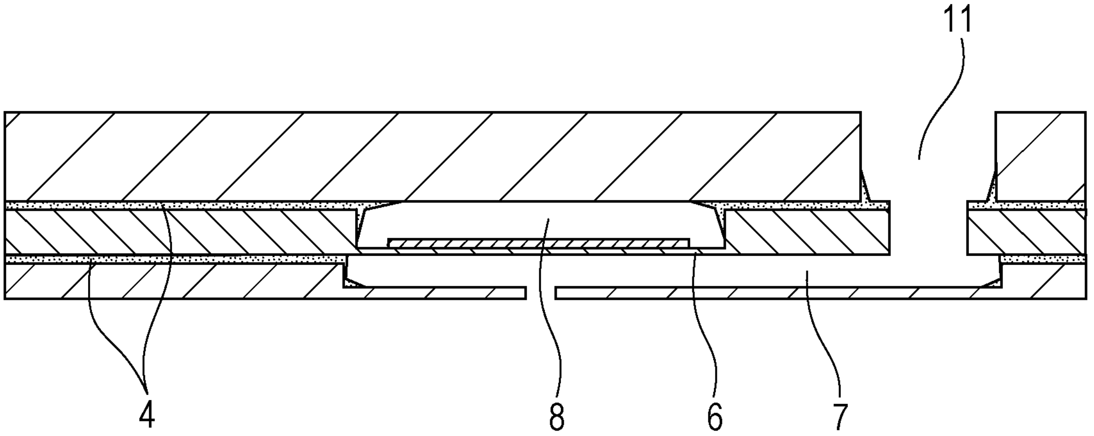
FIG. 16 is a sectional view of the joined substrates formed in accordance with the third embodiment of the disclosure.

FIG. 16 is a sectional view of the substrates joined together by the adhesive 4, or the first substrate 1, the second substrate 2, and the third substrate 3 formed in accordance with the third embodiment of the disclosure as illustrated in FIGS. 15A to 15C. The third embodiment of the disclosure controls protrusion of an adhesive in joined substrates having multiple joined surfaces and allows the joined substrates to have good ejection performance without being affected by the adhesive.

Forth Embodiment

Substrates for a liquid ejection head according to a fourth embodiment of the disclosure will be described below with reference to the drawings. In the embodiment described below, specific statements may be made for sufficient explanation of the disclosure. These statements illustrate an example and are not particularly intended to limit the scope of the disclosure. The following description will focus on the difference between the fourth embodiment and the second embodiment.

Although the figures of the fourth embodiment illustrate the liquid ejection head oriented such that ejection ports are located at an upper level and liquid supply ports are located at a lower level, such orientation is taken in fabricating a passage defining member of the liquid ejection head. In most cases, the liquid ejection head is oriented such that the ejection ports are located at a lower level when used.

Figure 17:
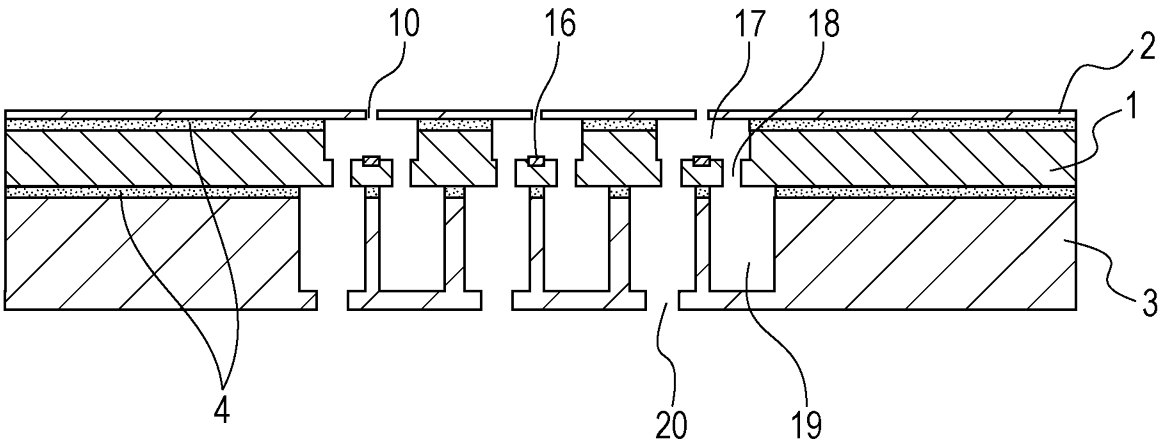
FIG. 17 is a sectional view of joined substrates in a fourth embodiment.
Figure 18A:
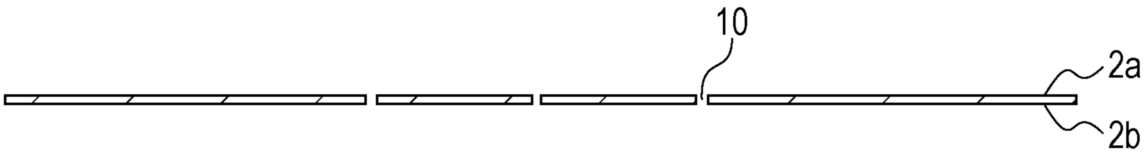
FIGS. 18A to 18B' are sectional views of the respective substrates in the fourth embodiment.
Figure 18B:
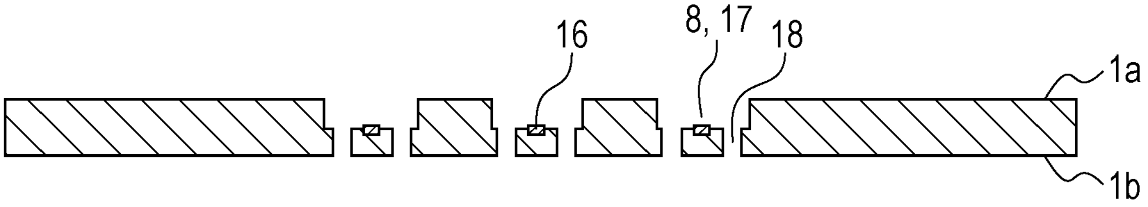
Figure 18C:
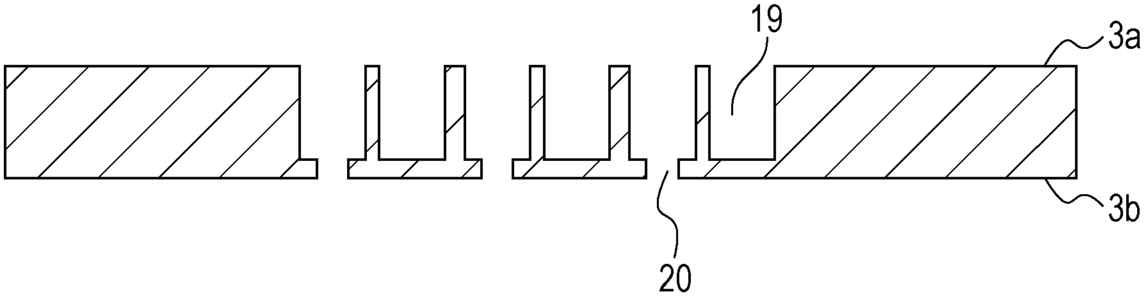
Figure 18B:
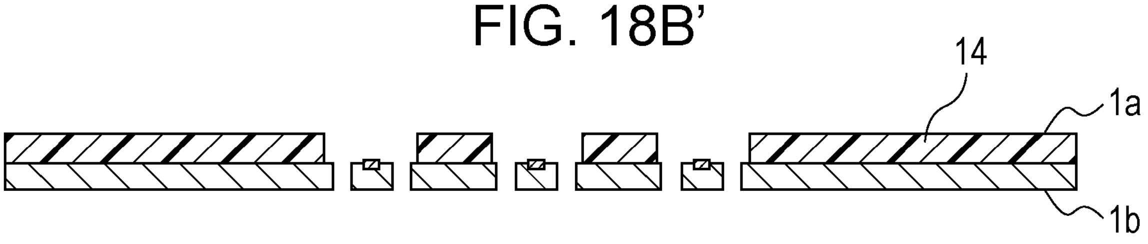

FIG. 17 is a sectional view of joined substrates for the liquid ejection head according to the fourth embodiment of the disclosure. In FIG. 17, effects of the adhesive on openings, or the problems to be solved in the disclosure, are not illustrated. FIGS. 18A to 18C are sectional views of the substrates in the fourth embodiment separated from each other. The respective substrates are joined together with the adhesive 4 to form a liquid ejection head substrate.

The first substrate 1 is, for example, a silicon substrate. The first surface 1*a* has the energy generating elements 16 and the supply ports 18 corresponding to the energy generating elements 16. The first surface 1*a* of the first substrate 1 has the recesses 8. Each of the energy generating elements 16 is located on the bottom of the recess 8. The recesses 8 may be formed by processing the substrate. As illustrated in FIG. 18B', the recesses 8 can be formed at desired positions by exposure and development with, for example, the permanent resist 14, such as SU-8.

The second substrate 2 is, for example, a silicon substrate or a stainless steel substrate, and has multiple ejection ports 10 for liquid ejection. The second surface 2*b* of the second substrate 2 is joined to the first surface 1*a* of the first substrate 1 such that the ejection ports 10 are aligned with the respective energy generating elements 16. The recesses 8 at the first surface 1*a* of the first substrate 1 serve as the common liquid chambers 17. For example, it is assumed that the energy generating element 16 is an electrothermal transducing element. Under a drive voltage applied by a drive IC (not illustrated), the electrothermal transducing element instantaneously generates bubbles in the liquid. A change in pressure in the common liquid chamber 17 caused by growth of the bubbles is used to eject liquid droplets through the ejection port 10.

The third substrate 3 is, for example, a silicon substrate. The third substrate 3 has the passages 19 integrated with a passage conversion member. The passages 19 include liquid supply passages and liquid collection passages as in the second embodiment. A pressure difference generated by a negative pressure control unit (not illustrated) causes the liquid in the liquid supply passage to flow through the supply port 18 to the common liquid chamber 17 and further flow through the supply port 18 to the liquid collection passage. The second surface 3*b* of the third substrate 3 has the openings 20 for passage conversion. The openings 20 and the passages 19 extend through the third substrate 3.

The supply ports 18 in the first substrate 1 communicate with the passages 19 in the third substrate 3 such that the liquid is directed from the passages 19 through the supply ports 18 to the common liquid chambers 17 having therein the energy generating elements 16.

Figure 19:
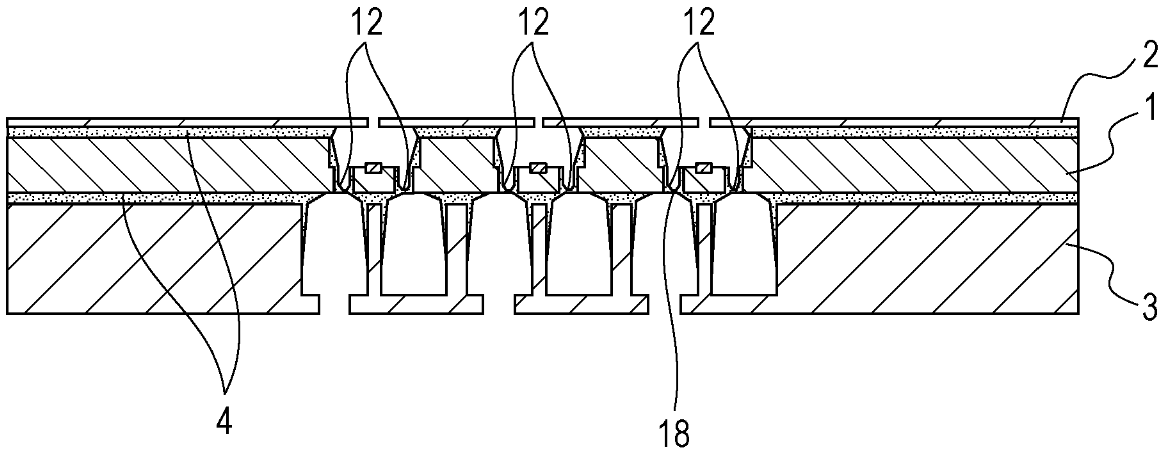
FIG. 19 is a sectional view of the joined substrates illustrating issues addressed in the disclosure.

FIG. 19 is a schematic sectional view of the first substrate 1, the second substrate 2, and the third substrate 3 joined together with the adhesive 4. Portions 12 affected by the adhesive in FIG. 19 will now be described. If the adhesive 4 is not controlled and kept from protruding, the adhesive 4 may protrude into the recesses 8 of the first surface 1*a* of the first substrate 1, extend along the corners of the recesses 8, and obstruct the supply ports 18.

Furthermore, the adhesive 4 may protrude into the passages 19 at the second surface 1*b* of the first substrate 1, extend along the corners of the passages 19, and similarly obstruct the supply ports 18.

Obstruction of the supply ports 18 by protruding parts of the adhesive 4 may block the supply ports 18, so that the liquid cannot be supplied to the common liquid chambers 17. For a configuration in which the liquid in the liquid supply passages flows through the supply ports 18 to the common liquid chambers 17 and further flows through the supply ports 18 to the liquid collection passages as in the fourth embodiment, the supply ports 18 may be narrowed by the protruding parts of the adhesive. This may make it difficult for, for example, the liquid increased in viscosity by evaporation through the ejection ports 10, bubbles, and a foreign substance, to be collected into the liquid collection passages. Thus, the liquid in the ejection ports 10 and the common liquid chambers 17 may increase in viscosity and thus affect ejection performance.

According to the fourth embodiment of the disclosure, the relationship between the curvature radii of the corners of the openings at the joined surfaces of the substrates joined together with the adhesive is defined to control the protruding parts of the adhesive, thus achieving good ejection performance.

Figure 20A:
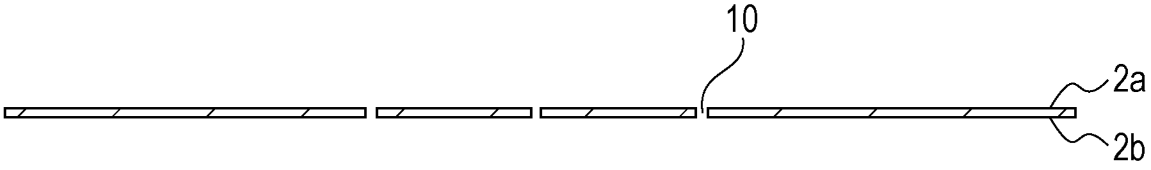
FIGS. 20A to 20C are sectional views of the respective substrates formed in accordance with the fourth embodiment of the disclosure.
Figure 20B:
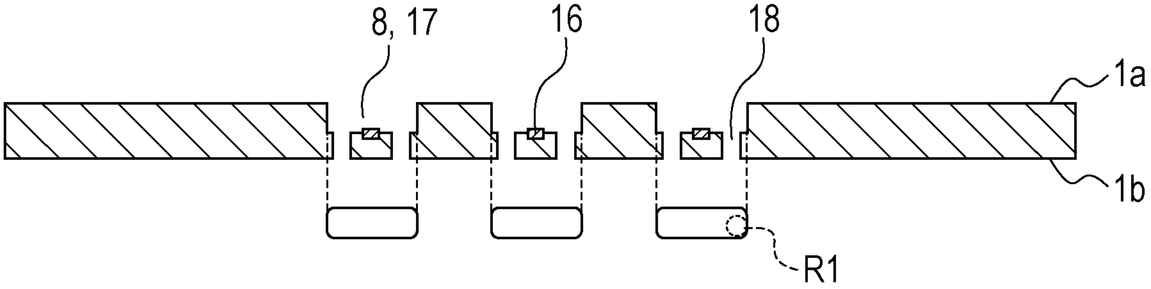
Figure 20C:
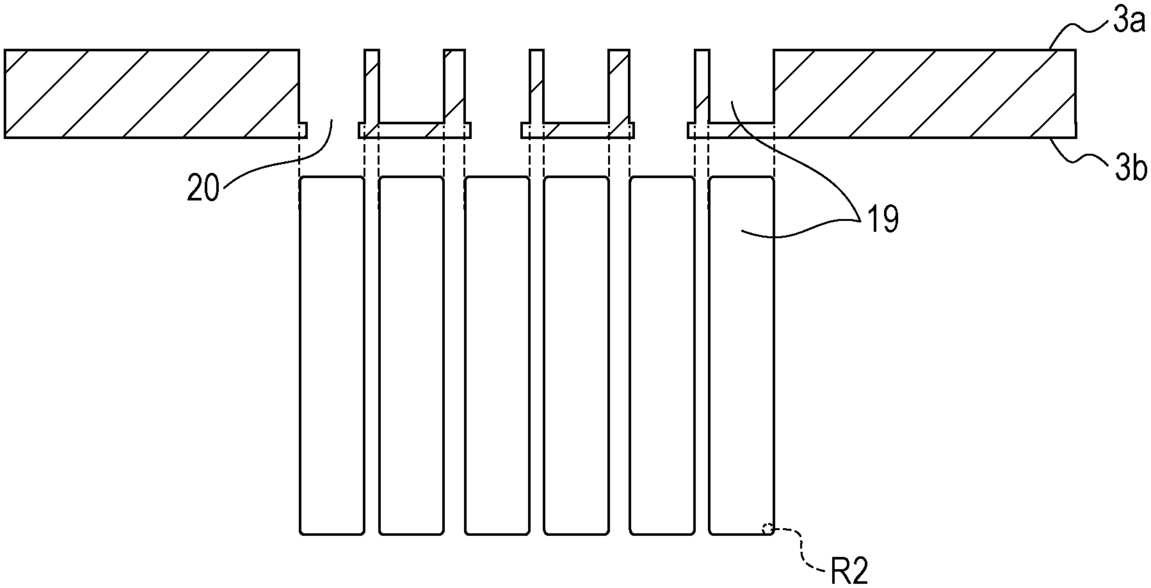

FIGS. 20A to 20C include plan views of the openings of the first substrate 1, the second substrate 2, and the third substrate 3 in the fourth embodiment of the disclosure. A large curvature radius R1 of each corner of the openings, serving as the recesses 8, in FIG. 20B can inhibit the adhesive 4 protruding on the second surface 2*b* of the second substrate 2 from extending along the corners of the recesses 8, thus reducing or eliminating the effects of the adhesive 4 on the supply ports 18.

Furthermore, a small curvature radius R2 of each corner of the passages 19 in FIG. 20C allows the adhesive 4 protruding on the first surface 3*a* of the third substrate 3 to extend along the corners of the passages 19, thus reducing or eliminating the effects of the adhesive 4 on the supply ports 18. In other words, the curvature radii R1 and R2 satisfying $R1>R2$ can reduce or eliminate the effects of the adhesive 4 on the supply ports 18.

As demonstrated in FIG. 5, the curvature radius R1, which is intended to inhibit the adhesive from extending along the corner, is preferably greater than 20 μm, more preferably greater than or equal to 30 μm. The curvature radius R2, which is intended to promote extension of the adhesive along the corner, is preferably less than 12 μm, more preferably less than or equal to 8 μm.

Figure 21:
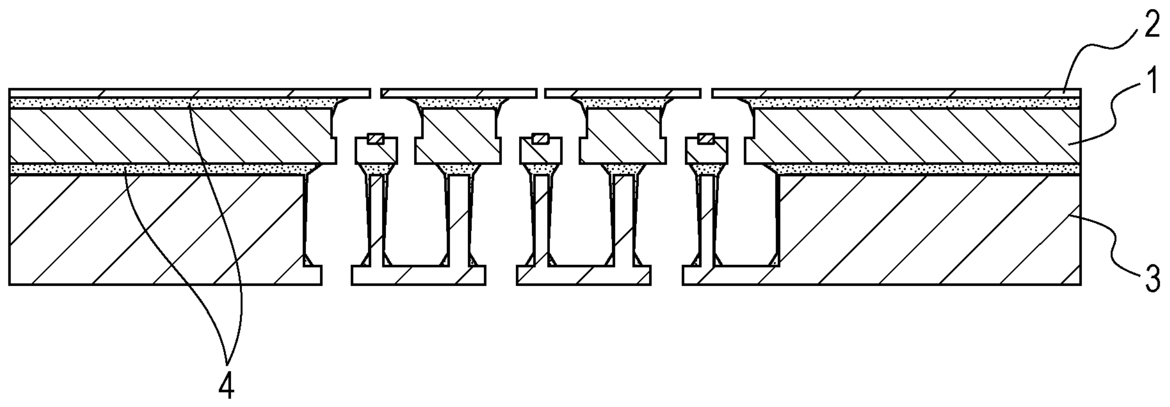
FIG. 21 is a sectional view of the joined substrates formed in accordance with the fourth embodiment of the disclosure.

FIG. 21 is a sectional view of the substrates joined together by the adhesive 4, or the first substrate 1, the second substrate 2, and the third substrate 3 formed in accordance with the fourth embodiment of the disclosure as illustrated in FIGS. 20A to 20C. The fourth embodiment of the disclosure controls protrusion of an adhesive in joined substrates having multiple joined surfaces and allows the joined substrates to have good ejection performance without being affected by the adhesive.

The embodiments of the disclosure can provide a liquid ejection head with controlled flow of an adhesive protruding relative to a structure located at joined surfaces of substrates.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-192914, filed Nov. 29, 2021, which is hereby incorporated by reference herein in its entirety.

What is claimed is:

1. A liquid ejection head comprising:

a first substrate having a first surface and a second surface opposite the first surface, the first surface having a structure;

a second substrate having a second surface facing the first surface of the first substrate; and a third substrate having a first surface facing the second surface of the first substrate, the first substrate and the second substrate being joined together by an adhesive located between the first surface of the first substrate and the second surface of the second substrate, the first substrate and the third substrate being joined together by the adhesive located between the second surface of the first substrate and the first surface of the third substrate, the second surface of the first substrate having an opening that is located in a region on a rear side of the structure and that has corners each having a curvature radius R2, the second surface of the second substrate having an opening that is located in a region facing the structure and that has corners each having a curvature radius R1, the curvature radii R1 and R2 satisfying $R1<R2$, wherein the second substrate further has a through-hole extending through the second substrate and including a stepped portion, the through-hole including the stepped portion has an opening that is located at the second surface of the second substrate and that has corners each having a curvature radius R3, and the curvature radii R1, R2, and R3 satisfy $R3 \le R1 < R2$.

2. The liquid ejection head according to claim 1, wherein the opening at the second surface of the first substrate and the third substrate define a space that serves as a pressure chamber.

3. The liquid ejection head according to claim 1, wherein the third substrate further has an ejection port for liquid ejection and a liquid ejection passage for liquid supply to the ejection port, the liquid ejection passage has corners each having a curvature radius R4, and the curvature radii R2 and R4 satisfy $R4 \ge R2$.

4. The liquid ejection head according to claim 1, wherein the second substrate has an ejection port, the opening of the second substrate and the first substrate define a space that serves as a common liquid chamber, the third substrate and the opening of the first substrate define a space that serves as a passage, and the structure is an energy generating element configured to generate energy that causes liquid to be ejected through the ejection port.

5. The liquid ejection head according to claim 4, wherein the third substrate further has an opening connected to the passage, the opening of the third substrate has corners each having a curvature radius R5, and the curvature radii R1, R2, and R5 satisfy R1<R2<R5.

6. The liquid ejection head according to claim 4, wherein the energy generating element is an electrothermal transducing element.

7. The liquid ejection head according to claim 1, wherein R1<12 μm and R2>20 μm.

8. The liquid ejection head according to claim 1, wherein the structure is a piezoelectric element configured to generate pressure for liquid ejection.

9. A liquid ejection head comprising:

a first substrate having a first surface and a second surface opposite the first surface, the first surface having a structure;

a second substrate having a second surface facing the first surface of the first substrate; and a third substrate having a first surface facing the second surface of the first substrate, the first substrate and the second substrate being joined together by an adhesive located between the first surface of the first substrate and the second surface of the second substrate, the first substrate and the third substrate being joined together by the adhesive located between the second surface of the first substrate and the first surface of the third substrate, the second surface of the first substrate having an opening that is located in a region on a rear side of the structure and that has corners each having a curvature radius R2, the second surface of the second substrate having an opening that is located in a region facing the structure and that has corners each having a curvature radius R1, the curvature radii R1 and R2 satisfying R1<R2, wherein R1<12 μm and R2>20 μm.

10. The liquid ejection head according to claim 9, wherein the opening at the second surface of the first substrate and the third substrate define a space that serves as a pressure chamber.

11. The liquid ejection head according to claim 9, wherein the second substrate further has an opening that extends through the second substrate and that has corners each having a curvature radius R3, and the curvature radii R1, R2, and R3 satisfy R1<R3<R2.

12. The liquid ejection head according to claim 9, wherein the third substrate further has an ejection port for liquid ejection and a liquid ejection passage for liquid supply to the ejection port, the liquid ejection passage has corners each having a curvature radius R4, and the curvature radii R2 and R4 satisfy R4≥R2.

13. The liquid ejection head according to claim 9, wherein the second substrate has an ejection port, the opening of the second substrate and the first substrate define a space that serves as a common liquid chamber, the third substrate and the opening of the first substrate define a space that serves as a passage, and the structure is an energy generating element configured to generate energy that causes liquid to be ejected through the ejection port.

14. The liquid ejection head according to claim 13, wherein the third substrate further has an opening connected to the passage, the opening of the third substrate has corners each having a curvature radius R5, and the curvature radii R1, R2, and R5 satisfy R1<R2<R5.

15. The liquid ejection head according to claim 13, wherein the energy generating element is an electrothermal transducing element.

16. The liquid ejection head according to claim 9, wherein the structure is a piezoelectric element configured to generate pressure for liquid ejection.

* * * * *